(12) United States Patent
Fujino

(10) Patent No.: US 8,265,003 B2
(45) Date of Patent: Sep. 11, 2012

(54) PACKET DISTRIBUTION SYSTEM AND PACKET DISTRIBUTION METHOD

(75) Inventor: Shozo Fujino, Tokyo (JP)

(73) Assignee: NEC Corporation, Tokyo (JP)

( * ) Notice: Subject to any disclaimer, the term of this patent is extended or adjusted under 35 U.S.C. 154(b) by 579 days.

(21) Appl. No.: 12/440,617

(22) PCT Filed: Sep. 11, 2007

(86) PCT No.: PCT/JP2007/067662
§ 371 (c)(1),
(2), (4) Date: Mar. 10, 2009

(87) PCT Pub. No.: WO2008/032709
PCT Pub. Date: Mar. 20, 2008

(65) Prior Publication Data
US 2010/0014451 A1 Jan. 21, 2010

(30) Foreign Application Priority Data
Sep. 15, 2006 (JP) ................................ 2006-251743

(51) Int. Cl.
H04J 3/08 (2006.01)
H04J 3/16 (2006.01)
H04L 12/56 (2006.01)

(52) U.S. Cl. ........ 370/315; 370/466; 370/392; 370/401; 370/474

(58) Field of Classification Search .................. 370/315, 370/465–466, 474, 392, 338, 390, 389, 401
See application file for complete search history.

(56) References Cited

U.S. PATENT DOCUMENTS

| | | | |
|---|---|---|---|
| 6,118,758 A * | 9/2000 | Marchok et al. | 370/210 |
| 6,118,785 A * | 9/2000 | Araujo et al. | 370/401 |
| 6,778,532 B1 * | 8/2004 | Akahane et al. | 370/392 |
| 6,868,083 B2 * | 3/2005 | Apostolopoulos et al. | 370/392 |
| 7,447,221 B2 * | 11/2008 | Namihira | 370/401 |
| 7,457,273 B2 * | 11/2008 | Nakanishi et al. | 370/338 |
| 7,554,982 B2 * | 6/2009 | Nakamura et al. | 370/392 |
| 7,561,570 B2 * | 7/2009 | Kondo | 370/392 |
| 7,586,939 B2 * | 9/2009 | Inoue et al. | 370/465 |

(Continued)

FOREIGN PATENT DOCUMENTS

JP 2003087306 A 3/2003

(Continued)

OTHER PUBLICATIONS

International Search Report for PCT/JP2007/067662 mailed Oct. 9, 2007.
M. Otani et al., "Implementation and Verification of an Application with the Function of Active Path Selection in IPv6 Environment", Transactions of Information Processing Society of Japan, vol. 42, pp. 2878 to 2886, Dec. 15, 2001, passage 2.2.

(Continued)

*Primary Examiner* — Kwang B Yao
*Assistant Examiner* — Candal Elpenord

(57) ABSTRACT

Provided is a technique for switching a session between a terminal and a network to a session using a plurality of peripheral terminals having respective functions, by considering the load on the distribution side system and distributing a packet to the plurality of peripheral terminals. This application for relaying a packet transmitted from a distribution node via a communication device in response to a request from a terminal to a relay destination peripheral terminal that becomes a relay destination, characterized in comprising: data acquiring means for decapsulating the packet encapsulated by the communication device, thereby to acquire a payload data; outputting means for outputting the acquired data by the data acquiring means to a predetermined reproduction function; and relay processing means for, based upon header information being contained in the decapsulated packet, relaying the decapsulated packet to the relay destination peripheral terminal.

14 Claims, 5 Drawing Sheets

U.S. PATENT DOCUMENTS

| | | | |
|---|---|---|---|
| 7,590,081 B2* | 9/2009 | Furukawa et al. | 370/315 |
| 7,782,834 B2* | 8/2010 | Chitrapu | 370/349 |
| 7,948,927 B2* | 5/2011 | Yoneda | 370/312 |
| 2004/0058644 A1* | 3/2004 | Saigo et al. | 455/11.1 |
| 2006/0126649 A1* | 6/2006 | Akiyoshi | 370/401 |
| 2006/0133371 A1* | 6/2006 | Matoba | 370/389 |

FOREIGN PATENT DOCUMENTS

| | | |
|---|---|---|
| JP | 2005287074 A | 10/2005 |
| JP | 2006191514 A | 7/2006 |

OTHER PUBLICATIONS

S. Fujino et al., "Authentication procedure and Terminal switching scheme for Personal Area Network services", IEICE Technical Report NS 2005/200, pp. 169-172, Feb. 23, 2006, passages 2.2, 4.2-4.2.2, Fig.4.

H. Denpo et al., "Personal Area Network Support in an All-IP Network", Proceedings of the 2005 IEICE Communications Society Conference, BS-2-10, Sep. 7, 2005, pp. S-19 to S-20.

* cited by examiner

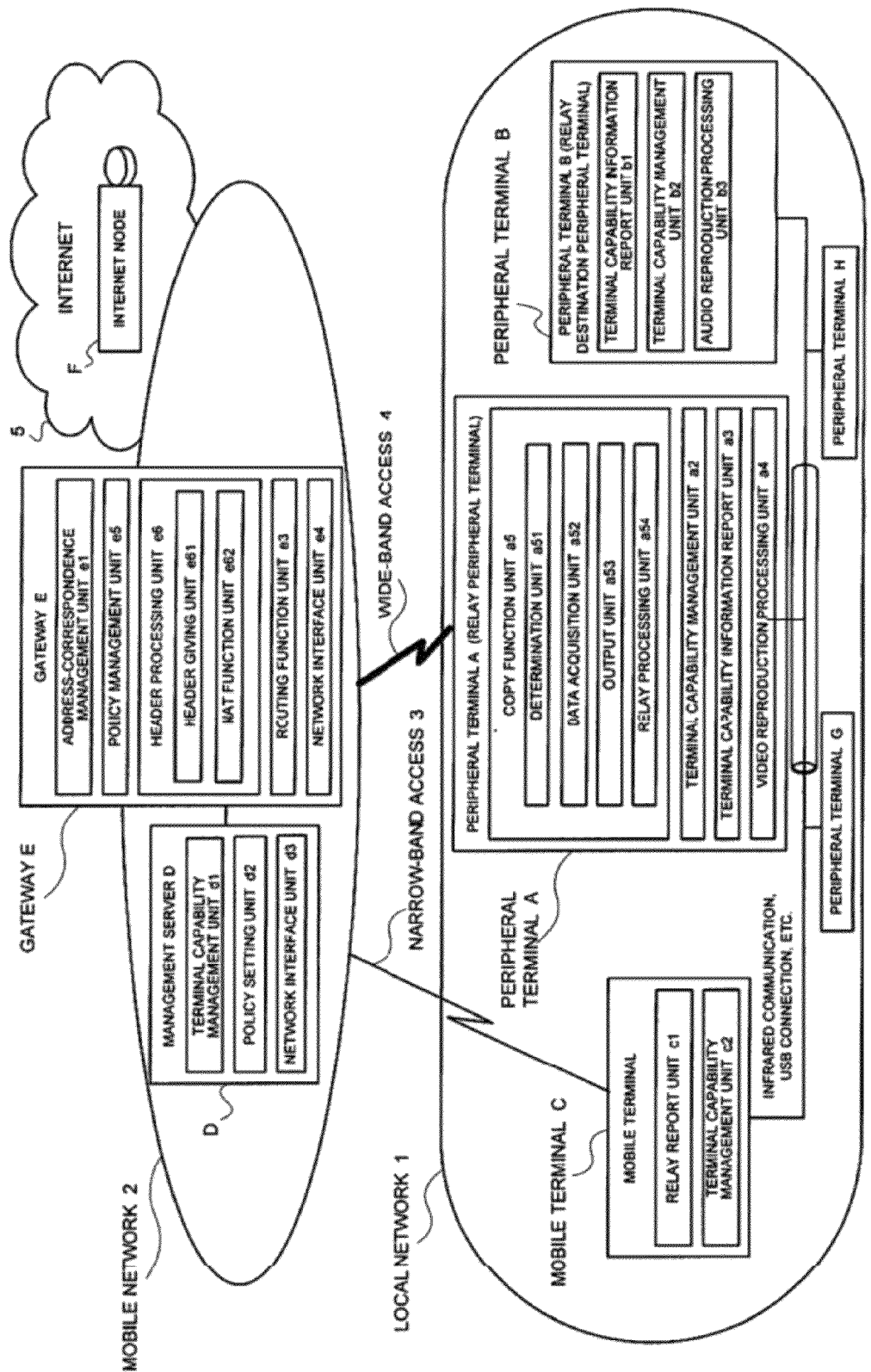

PACKET DISTRIBUTION SYSTEM AND PACKET DISTRIBUTION METHOD

This application is the National Phase of PCT/JP2007/067662, filed Sep. 11, 2007, which is based upon and claims the benefit of priority from Japanese patent application No. 2006-251743, filed on Sep. 15, 2006, the disclosure of which is incorporated herein in its entirety by reference.

APPLICABLE FIELD IN THE INDUSTRY

The present invention relates to a distribution technique of a packet, and more particularly to a packet distribution technology of distributing a packet transmitted from a distribution node in response to a request from a terminal to a plurality of terminals.

BACKGROUND ART

Use of a mobile telephone as an Internet terminal has drastically progressed, and services as well utilizing the mobile telephone have been diversified. The recent mobile telephone, which utilizes infrared-ray communication or USB, is connectable to other peripheral terminals, and utilization thereof as a mobile terminal has been generalized. Further, the mobile telephone is inclined to increasingly process a large capacity of data.

Under such a situation, a technology of shifting a session in communication from a narrow-band mobile terminal to a terminal having a wide-band interface provided therein has already been generalized.

For example, there exists the general method in which, when a user shifts a session in communication from a narrow-band cellular terminal to the terminal having a wide-band interface such as ADSL, Wi-Fi, and WIMAX in order to view larger-screen and higher-quality video (that is, when he/her makes a handover between the terminals), the terminal to which a switchover has been made negotiates with a communication counterpart by a session protocol such as SIP, and constructs a new session.

Further, the technology has been proposed of delivering the packet to a communication terminal over PAN (personal area network) by using a plurality of communication links, and transferring the packet to the communication terminal over the PAN by using the communication link (W-CDMA etc. in the case of VoIP) in accordance with an application (Patent document 1).

Herein, the so-called PAN is a name of a network that the mobile telephone having a subscriber identifier to a mobile network, and a plurality of peripheral terminals connected to each other via a short-distance connection form, and at present, architecture thereof has been proposed in a standardization organization of mobile communication. The above-mentioned handover scheme between the terminals is a technology that is applicable in the PAN as well. Further, the so-called peripheral terminal, which is a network-correspondence terminal that is operatable in alignment with the mobile terminal, becomes connectable to the network side at the moment of making a switchover of the session with mobile terminal realized in the network side. For example, there exist a network-correspondence display, a network-correspondence speaker, etc. as a peripheral terminal.

By the way, while such technologies have been proposed, some issues at point exist therein.

For example, the technology disclosed in the Patent document 1 necessitates a plurality of the communication links when switching the session realized in the mobile terminal, for example, to the session using a plurality of the peripheral terminals together each having a video reproduction function or an audio reproduction function. For this, for example, a streaming server, being a device existing in a side where video and audio are distributed, has to analyze a streaming data itself, thereby to allot the packet to an exclusive reproduction appliance, etc. communication session by communication session, which imposes a load upon a distribution-side server.

Further, the above technology necessitate performing a data copy in an Internet side/a network-side network at the moment of distributing the streaming data etc. to a plurality of the peripheral terminals, and the data copy becomes burdensome as an amount of the data is increased. That is, the data copy demands a lot of hardware resources such as a hard disc, and a load upon a system at the time of the copying process becomes unnegligible as an amount of the data is increased.

In addition hereto, traffic is increased and a load is imposed upon the network as well at the moment of distributing the packet to a plurality of the terminals by employing means such as bi-cast and multicast.

Switching the session realized in the mobile terminal to the session using a plurality of the peripheral terminals together having respective functions necessitates installing an interface for connecting to an external network such as a mobile network into respective peripheral terminals in the reception side as well of the content, which is non-efficient in terms of a communication cost and a management of communication appliances.

Thereupon, the technology has been proposed of alleviating a load at the time of the distribution by installing another node such as a back-up device, and causing it to perform a copying process. For example, the data copying technology at the time of communication has been disclosed in Patent document 2 and Patent document 3.

[Patent document 1] JP-P2006-191514A
[Patent document 2] JP-P2005-287074A
[Patent document 3] JP-P2003-087306A

DISCLOSURE OF THE INVENTION

[Problems to be Solved by the Invention]

However, even though such technologies are employed, the foregoing problems yet remain to be solved.

Not only the invention of the Patent document 2 but also the invention of the Patent document 3 is for performing a copying process in the distribution side, i.e. the mobile network/Internet side, so a problem that a load is imposed upon a distribution-side system and network, and a load is imposed upon a system administrator as well exists as before.

Thus, an object of the present invention for solving the problems is to provide a technology of distributing the packet to a plurality of the peripheral terminals by taking a load upon the distribution-side network system into consideration at the moment of switching the session realized between the mobile terminal and the network side to the session using a plurality of the peripheral terminals together having respective functions.

[Means for Solving the Problem]

A first invention for solving the above-mentioned problems, which is a packet distribution system, is characterized in that: the first invention has: a terminal having: selecting means for selecting a relay peripheral terminal for relaying a packet, and a relay destination peripheral terminal that becomes a relay destination of the relay peripheral terminal from among a plurality of peripheral terminals; and reporting means for reporting identification information including information associated with at least addresses of the relay destination peripheral terminal and the relay peripheral terminal selected by the selecting means; and a communication device having header processing means for changing a destination of a header of the packet transmitted from a distribution node in response to a request from the terminal to the address of the relay destination peripheral terminal based upon the identification information, encapsulating this packet, and giving an external header including the address of the relay peripheral terminal; and the relay peripheral terminal includes: data acquiring means for decapsulating the packet encapsulated by the communication device, thereby to acquire a data of a payload part; outputting means for outputting the data acquired by the acquiring means to a predetermined reproduction function; and relay processing means for, based upon header information being contained in the decapsulated packet, relaying the decapsulated packet to the relay destination peripheral terminal.

A second invention for solving the above-mentioned problems, which is a terminal, is characterized in having: selecting means for, based upon information associated with a function or a performance that each of a plurality of peripheral terminals manages, selecting a relay peripheral terminal for relaying a packet transmitted from a distribution node in response to a request from a terminal, and a relay destination peripheral terminal that becomes a relay destination of the relay peripheral terminal from among the plurality of the peripheral terminals; and reporting means for reporting identification information including information associated with at least addresses of the relay destination peripheral terminal and the relay peripheral terminal selected by the selecting means.

A third invention for solving the above-mentioned problems, which is a management server, is characterized in having: preserving means for preserving information reported from a terminal, which is associated with a function or a performance that each of a plurality of peripheral terminals manages; selecting means for, based upon the preserved information, selecting a relay peripheral terminal for relaying a packet transmitted from a distribution node in response to a request from the terminal, and a relay destination peripheral terminal that becomes a relay destination of the relay peripheral terminal from among the plurality of the peripheral terminals; and reporting means for reporting identification information including information associated with at least addresses of the relay destination peripheral terminal and the relay peripheral terminal selected by the selecting means.

A fourth invention for solving the above-mentioned problems, which is a communication device connected to a relay peripheral terminal for relaying a packet transmitted from a distribution node in response to a request from a terminal to a relay destination peripheral terminal that becomes a relay destination, is characterized in having header processing means for changing a destination of a header of the packet to an address of the relay destination peripheral terminal based upon identification information including information reported from the terminal, which is associated with at least addresses of the relay destination peripheral terminal and the relay peripheral terminal, encapsulating this packet, and giving an external header including the address of the relay peripheral terminal.

A fifth invention for solving the above-mentioned problems, which is a relay peripheral terminal for relaying a packet transmitted from a distribution node via a communication device in response to a request from a terminal to a relay destination peripheral terminal that becomes a relay destination, is characterized in including: data acquiring means for decapsulating the packet encapsulated by the communication device, thereby to acquire a data of a payload part; outputting means for outputting the data acquired by the data acquiring means to a predetermined reproduction function; and relay processing means for, based upon header information being contained in the decapsulated packet, relaying the decapsulated packet to the relay destination peripheral terminal.

A sixth invention for solving the above-mentioned problems, which is a packet distribution method, is characterized in including: a selecting step of causing a terminal to select a relay peripheral terminal for relaying a packet, and a relay destination peripheral terminal that becomes a relay destination of the relay peripheral terminal from among a plurality of peripheral terminals, a header processing step of changing a destination of a header of the packet transmitted from a distribution node in response to a request from the terminal to an address of the relay destination peripheral terminal based upon identification information including information reported from the terminal, which is associated with at least addresses of the relay destination peripheral terminal and the relay peripheral terminal, encapsulating this packet, and giving an external header including the address of the relay peripheral terminal, a data acquiring step of decapsulating the packet encapsulated in the header processing step, thereby to acquire a data of a payload part; an outputting step of outputting the data acquired in the data acquiring step to a predetermined reproduction function; and a relay processing step of, based upon header information being contained in the decapsulated packet, relaying the decapsulated packet to the relay destination peripheral terminal.

An Advantageous Effect of the Invention

Making a configuration as mentioned above makes it possible to distribute a data to a plurality of the peripheral terminals with a load upon the distribution-side network system suppressed to a level as low as possible at the moment of switching the session realized between the mobile terminal and the network side to the session using a plurality of the peripheral terminals together having respective functions.

The reason is that there is no necessity for analyzing the content of the packet in the distribution side, and only transmission of the packet to the communication device constituting the present invention enables the packet to be distributed to the remaining relay destination peripheral terminals after going through a header process by the header processing means of the communication device and the relaying process by the relay peripheral terminal.

Further, it becomes possible to suppress the system load accompanied by the copying process to a level as low as possible in the peripheral appliance side as well.

The reason is that the above configuration includes determining means for making a reference to a destination of the internal header of the received packet, and determining whether or not this destination coincides with the address of the relay destination peripheral terminal, and the data acquiring means for acquiring a data of a payload part of the received packet when it has been determined by this determining means that this destination and the address coincide with each other in the peripheral terminal side.

BRIEF DESCRIPTION OF THE DRAWINGS

FIG. 5 is a block diagram illustrating the second embodiment of the present invention.

DESCRIPTION OF NUMERALS

Figure 1:
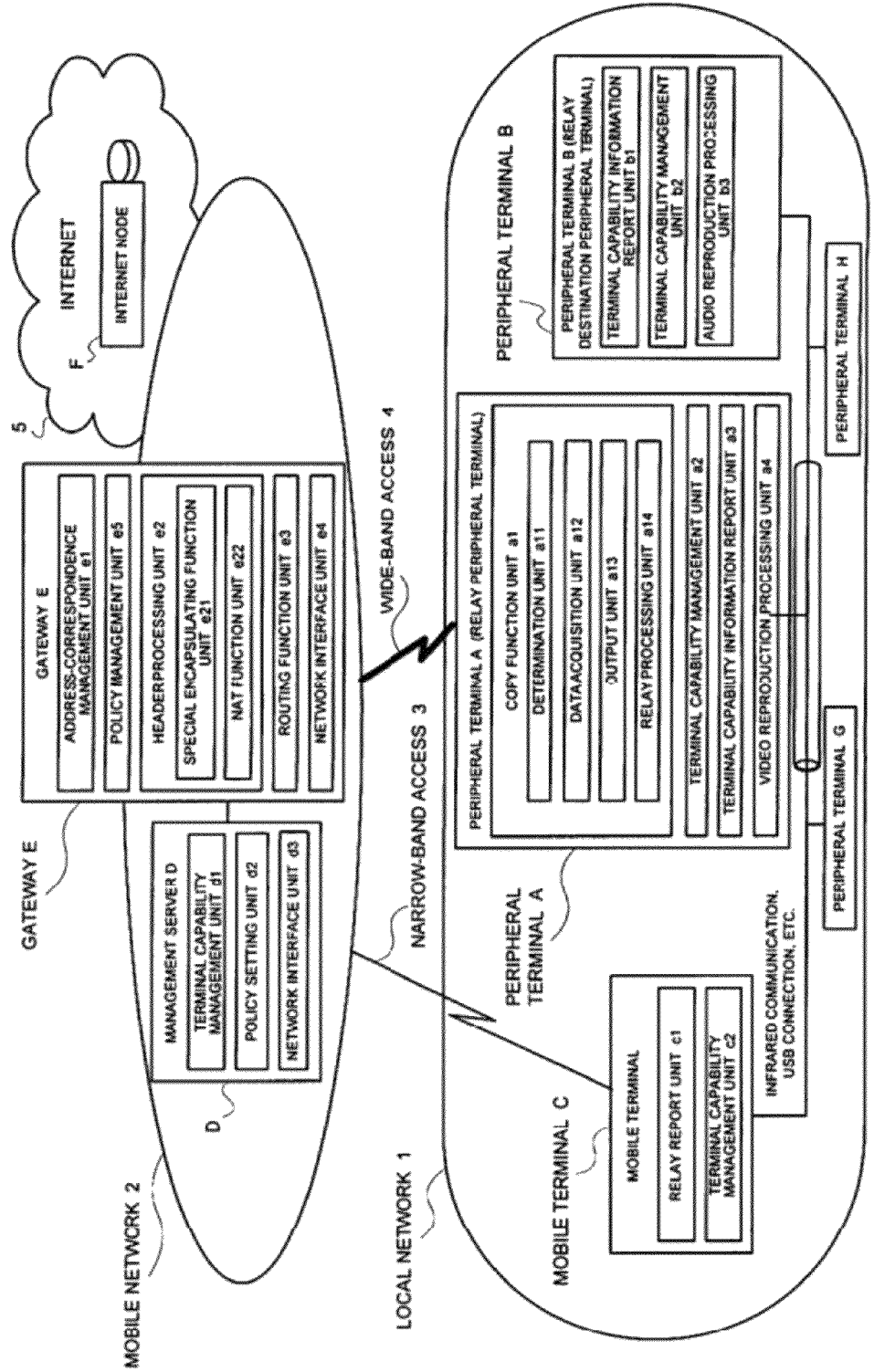
FIG. 1 is a block diagram illustrating a first embodiment of the present invention.

A peripheral terminal (relay peripheral terminal)
B peripheral terminal (relay destination peripheral terminal)
C mobile terminal
D management server
E gateway
F Internet node
G peripheral terminal
H peripheral terminal
1 local network
2 mobile network
3 narrow-band access
4 wide-band access
5 Internet
a1 copy function unit
a2 terminal capability management unit
a3 terminal capability information report unit
a4 video reproduction processing unit
b1 terminal capability information report unit
b2 terminal capability management unit
b3 audio reproduction processing unit
c1 relay report unit
c2 terminal capability management unit
d1 terminal capability management unit
d2 policy setting unit
d3 network interface unit
e1 address-correspondence management unit
e2 header processing unit
e3 routing function unit
e4 network interface unit
e5 policy management unit
e6 header processing unit

BEST MODE FOR CARRYING OUT THE INVENTION

Embodiments of the present invention will be explained by employing the accompanied drawings.

Figure 2:
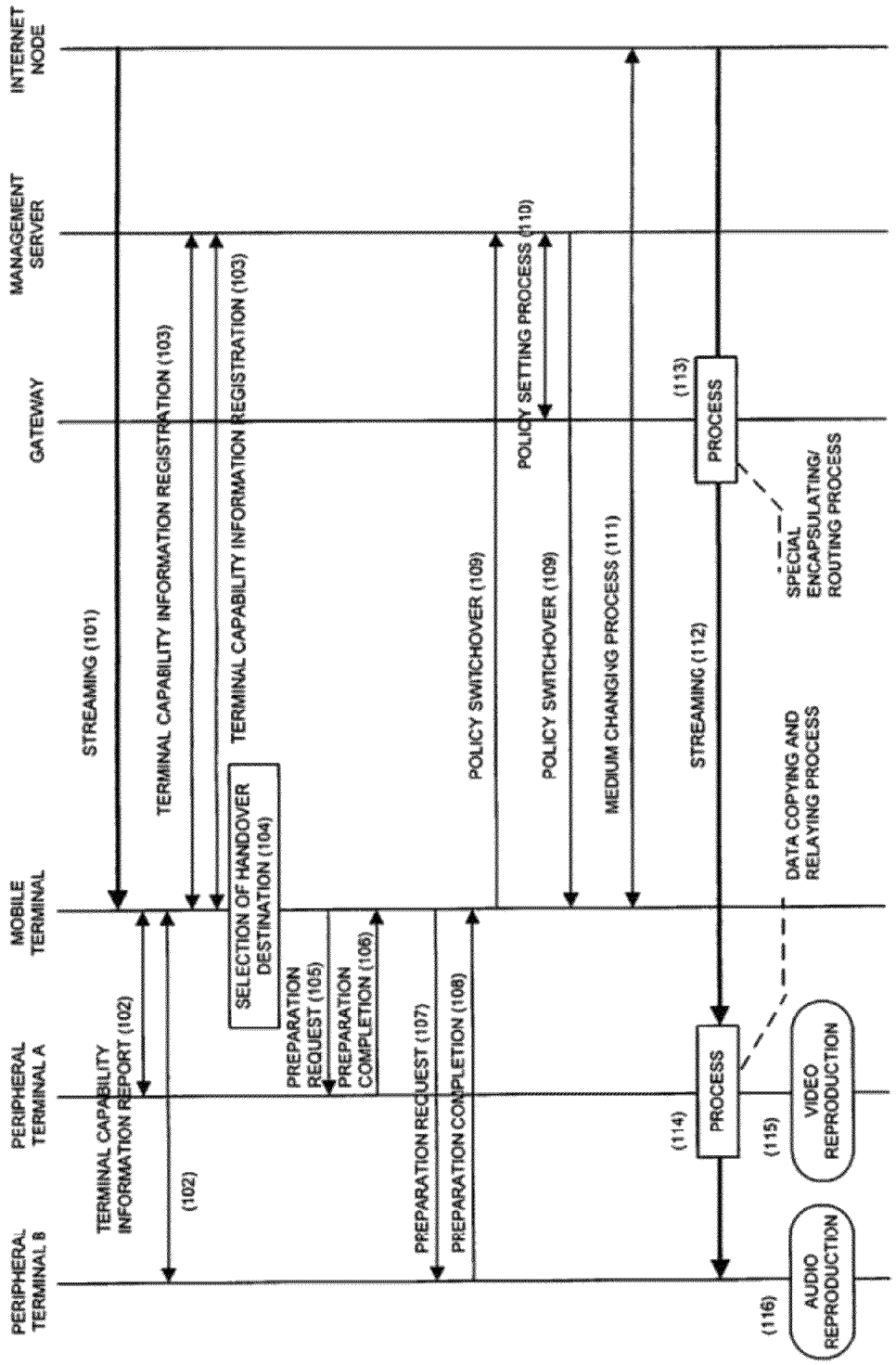
FIG. 2 is a sequence diagram illustrating a processing flow of the packet.
Figure 3:
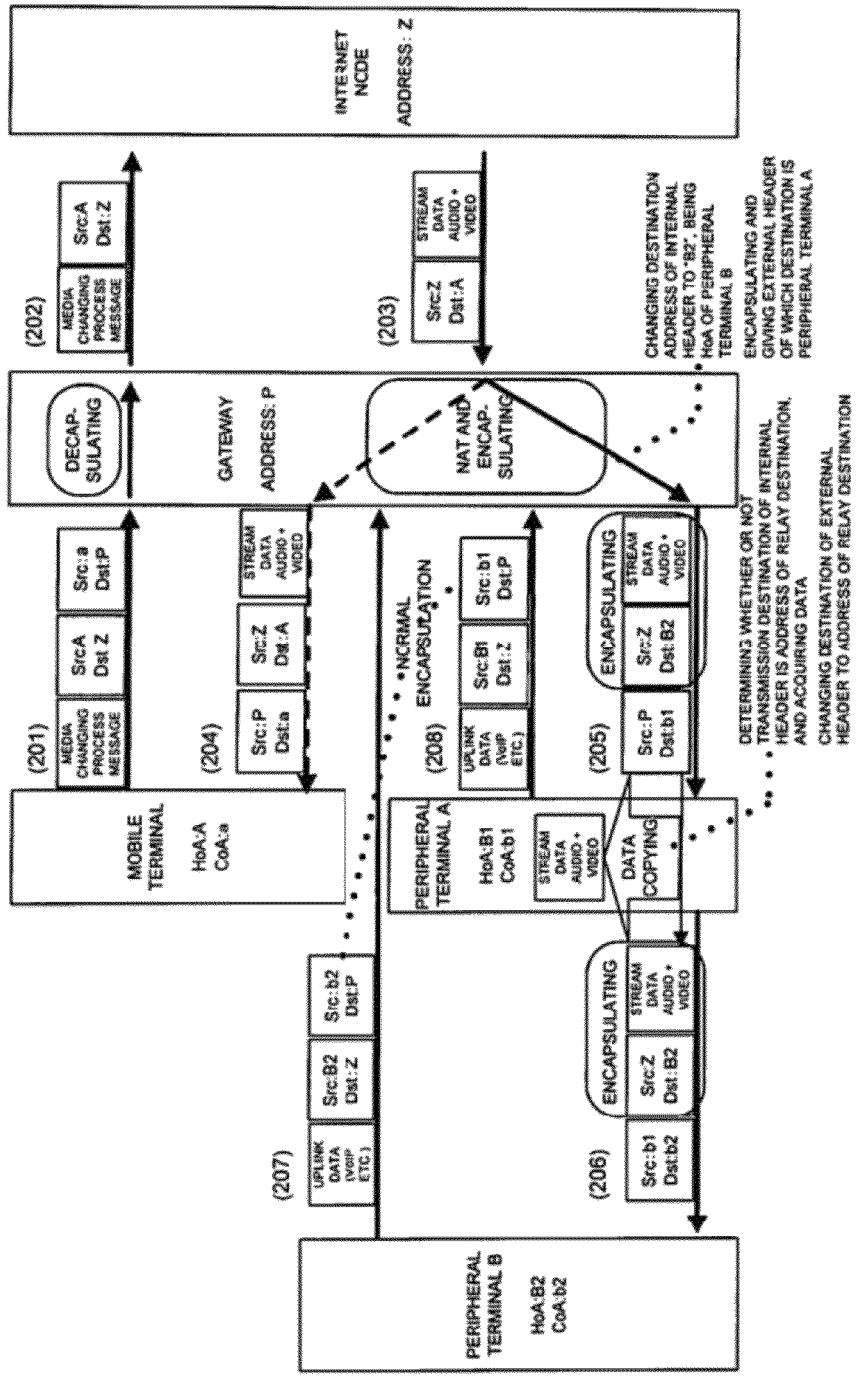
FIG. 3 is a view illustrating a configuration example of the packet in the first embodiment of the present invention.
Figure 4:
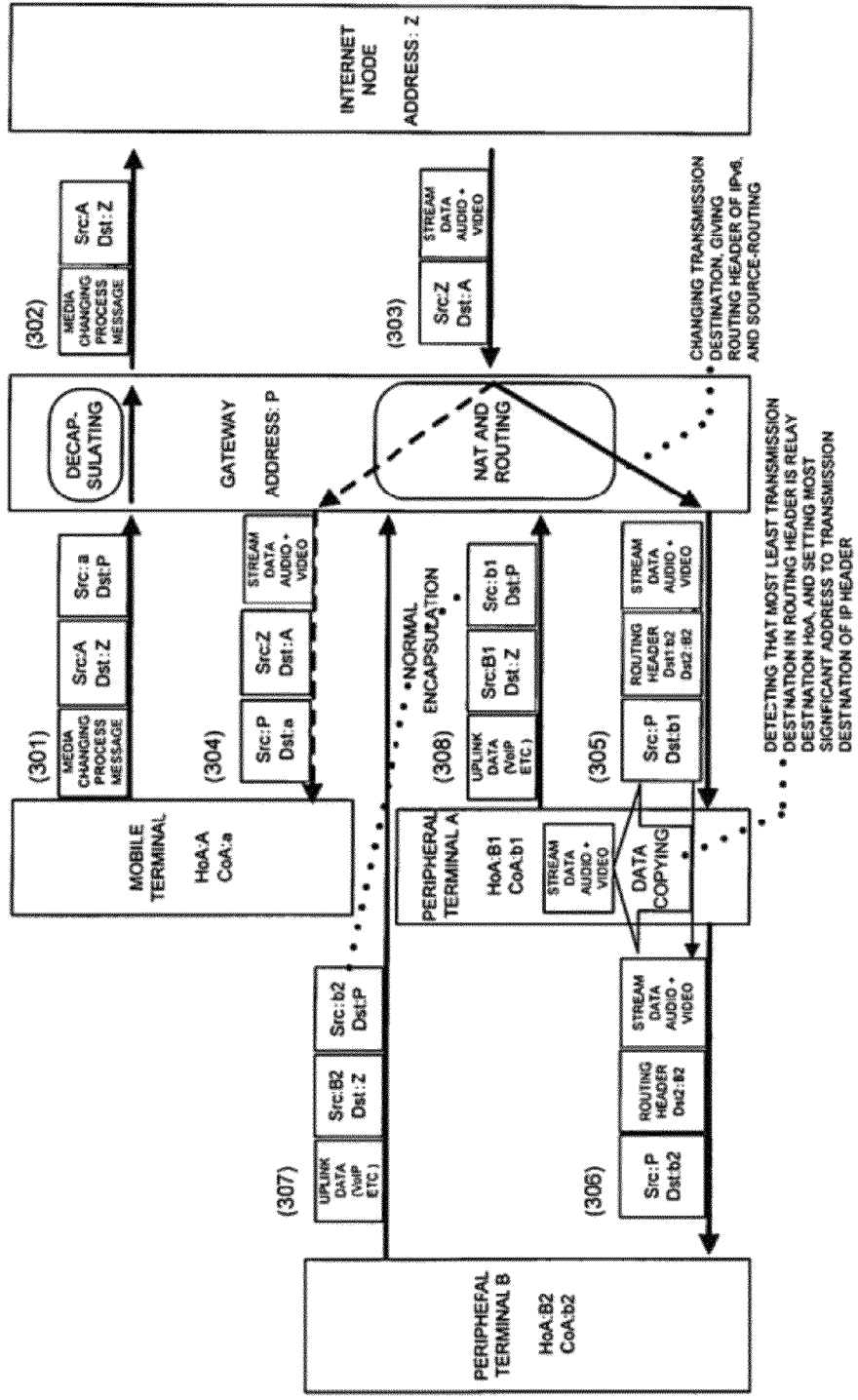
FIG. 4 is a view illustrating a configuration example of the packet in a second embodiment of the present invention.

Each of FIG. 1 to FIG. 4 is for explaining the first embodiment of the packet distribution system of the present invention, FIG. 1 is a block diagram of the packet distribution system, FIG. 2 is a sequence diagram of a process, and each of FIG. 3 and FIG. 4 is an explanatory view illustrating a packet configuration at the time of processing a header.

Upon making a reference to FIG. 1, C, which is a mobile terminal, is a terminal having subscribed for a service of a mobile network 2. An independent network is constructed among the mobile terminal C and the peripheral terminals. That is, the mobile terminal C is local-connected by a local network 1. What is herein called the local connection includes, for example, infrared-ray communication, and a connection technique such as a USB connection. In addition hereto, the mobile terminal C is connected to the mobile network 2, being an external network, via a narrow-band access 3. The narrow-band access 3 is a communication link of which a communication band is relatively narrow, for example, W-CDMA, and the mobile network 2 is, for example, a 3GPP network.

This mobile terminal C collects capability information, being information reported from the peripheral terminal within the local network 1, which is associated with a function or a processing performance of the terminal. Herein, the so-called capability information is information that the peripheral terminal is managing, for example, a processing performance, a video reproduction capability, and a moving picture reproduction capability of the terminal. The capability information collected by the mobile terminal C is employed for selecting the peripheral terminal that becomes a handover destination of the mobile terminal C, and for selecting the relay peripheral terminal for relaying the packet.

Each of A and B, which is a peripheral terminal that becomes an actual destination of the handover of the mobile terminal C, is a network-correspondence device. These peripheral terminal A and peripheral terminal B are a terminal selected based upon the capability information as an handover destination of the mobile terminal C from among the peripheral terminals A, B, G, and H, respectively.

The peripheral terminal A is connected to the mobile network 2 via a wide-band access 4. The wide-band access 4 is a communication link of which a communication band is wide, for example, ADSL. This peripheral terminal A has a function of acquiring a payload part of a packet received from a distribution-side node, and relaying the above packet to the peripheral terminal B. From now on, there is the case that the peripheral terminal A is referred to as a relay peripheral terminal, and the peripheral terminal B as a relay destination peripheral terminal.

F, which is an Internet node, is installed into an Internet 5. The Internet node F, which is a distribution node for providing multimedia data such as video and audio, is a so-called streaming server, or the like.

D is a management server, and more particularly, a management server for managing the capability information, being information acquired from the mobile terminal C, which is associated with functions or performances of various peripheral terminals. Herein, the management server D is installed into the mobile network 2. It may be installed into the local side in some cases, and may be installed into the Internet side in some cases.

E, which is installed between the local net 1 and the mobile network 2, is a communication appliance for providing routing of the packet or an NAT function, and is a so-called gateway. This gateway E, upon receipt of a downlink packet from the mobile terminal C, performs a special working process for a header, and routs it to the peripheral terminal (relay peripheral terminal) having a relay function. The details will be described later.

Herein, an internal configuration of each appliance will be specifically explained by employing FIG. 1.

The mobile terminal C includes a relay report unit c1 and a terminal capability management unit c2.

The terminal capability management unit c2 collects capability information reported from the peripheral terminal. Further, it selects the peripheral terminal that is best suited as a handover destination, and the relay peripheral terminal for performing a relaying process for the packet based upon the collected capability information. In addition hereto, the terminal capability management unit c2 manages address information of these selected peripheral terminals as identification information together with the capability information. Namely, it follows that this identification information includes correspondence information such as an IP address and a Mac address of each of the mobile terminal, and the peripheral terminals A and B that become a switchover destination of the session, respectively, in addition to the capability information. This identification information is registered into a gateway E as well via the management server D.

The relay report unit c1 reports the identification information that is being managed by the terminal capability management unit c2 to the peripheral terminal A (relay peripheral terminal) selected by the terminal capability management unit c2, and the management server D. Additionally, from now on, this report from the mobile terminal C to the management server D is called a policy switchover report in some cases.

The management server D includes a terminal capability management unit d1, a policy setting unit d2, and a network interface unit d3.

The terminal capability management unit d1 collects and preserves the capability information, the address information of the peripheral terminal, and the address information of the relay peripheral terminal reported by the relay report unit c1 of the mobile terminal C.

The policy setting unit d2 of the management server D registers a policy into the gateway E. Herein, the so-called policy is information for defining the switchover destination, and more particularly, is identification information including an IP address with which the destination of the peripheral terminal can be identified, an address with which a hardware attribute of the peripheral terminal can be identified, etc. out of the information that the terminal capability management unit d1 manages. Further, the so-called registration of a policy (policy registration) is a process for reflecting the above-mentioned policy into the gateway E, and the policy switchover report from the mobile terminal C becomes a trigger for registration. When this policy registration has been completed, this policy is applied to the stream communication subsequent hereto. That is, the session with the Internet node F is shifted from the session of which the destination is the mobile terminal C to the session of which the destination is the peripheral terminals A and B.

The network interface unit d3 is an interface that is employed at the moment of transmitting/receiving the packet to/from, other communication counterpart devices/nodes.

Continuously, an internal configuration of the gateway E will be explained. The gateway E includes an address-correspondence management unit e1, a policy management unit e5, a header processing unit e2, a routing function unit e3, and a network interface unit e4.

The address-correspondence management unit e1 has a mapping table to which a home address and a care-of-address have been mapped, and manages the home address and the care-of-address by employing this mapping table. Herein, the so-called home address is a unique and yet unchanged address that a mobile node keeps. Further, the so-called care-of-address is an address that is given to the mobile node in a movement destination, and more particularly, is an address for mobile communication that is given in a subnet existing within a communication range, and is used for the routing. Each of the mobile terminal C, the peripheral terminal A and the peripheral terminal B has two kinds of addresses, i.e. the home address and the care-of-address. Additionally, there exists MobileIP as one example of such a mobility management technology, and the detailed explanation is omitted because it is a well-known technology. Further, from now on, there is the case that the home address is abbreviated to HoA, and the care-of-address to CoA.

The policy management unit e5 manages identification information such as the IP address of each of the mobile terminal C, and the peripheral terminals A and B that become a switchover destination of the session, respectively. The policy setting unit d2 registers it.

The header processing unit e2 processes the header part of the packet so that the peripheral terminal A, which becomes a relay peripheral terminal, correctly relays the packet to the peripheral terminal B, being a relay destination peripheral terminal.

Specifically, the header processing unit e2 includes an NAT function unit e22 and a special encapsulating function unit e21.

The NAT function unit e22 modifies address information of a downlink packet received from the Internet node F based upon the mapping information of the address-correspondence management unit e1 and the identification information reported from the mobile terminal C. Specifically, it modifies information of a transmission destination address that exists in the header part of the received packet so that the transmission destination address is changed from the address of which the destination is the mobile terminal C to the address of which the destination is the peripheral terminal B, being a peripheral terminal of the relay destination.

The special encapsulating function unit e21 performs a special encapsulating process so that the peripheral terminal A correctly relays the packet to the another peripheral terminal B. Specifically, it encapsulates the packet address-transformed by the NAT function unit e22 into an encapsulated data, and gives this encapsulated data an IP header (external header) of which the transmission destination address is the peripheral terminal A, being a relay peripheral terminal.

The routing function unit e3 has a function of routing the packet encapsulated by the special encapsulating function unit e21 in addition to the normal IP routing function.

The network interface unit e4 is an interface that is employed in the case of transmitting/receiving the packet to/from other communication counterpart devices/nodes, and at the moment of routing the packet.

Next, the peripheral terminal A includes a copy function unit a1, a terminal capability management unit a2, a terminal capability information report unit a3, and a video reproduction processing unit a4.

The copy function unit a1 determines whether the received packet needs to be copied based upon header information thereof, acquires a payload part (a data excluding the header part out of the packet) of the packet when it has determined that the copy is required, and outputs it to an output function. In addition hereto, the copy function unit a1 transmits the packet, being a source of the copy, to the peripheral terminal B, being a peripheral destination of the relay destination.

Specifically, the copy function unit a1 includes a determination unit a11, a data acquisition unit a12, an output unit a13, and a relay processing unit a14.

The determination unit a11 determines whether or not the received packet is a packet that has been subjected to the encapsulating process by the special encapsulating function unit e21, and then has arrived. That is, the determination unit a11 decapsulates the received packet, and determines that it is a packet that has arrived by the network access by the normal IP header, namely, is not a packet that has arrived by the encapsulation of this technique when the destination being contained in the internal header of the decapsulated packet coincides with the CoA of the peripheral terminal A.

The data acquisition unit a12 acquires a data of the payload part of the packet based upon a result of a determination by the determination unit a11.

The output unit a13 outputs the data of the payload part acquired by the data acquisition unit a12 to the reproduction function.

The relay processing unit a14 furthermore transmits the received packet to the peripheral terminal B. Specifically, it transmits the received packet to the peripheral terminal B by adding the external header of which the destination is the address information of the peripheral terminal B pre-reported by the mobile terminal C to the encapsulated packet.

The terminal capability management unit a2 manages capability information such as a processing performance, a video reproduction capability, and a moving picture reproduction capability of its own terminal.

The terminal capability information report unit a3 reports the capability information that is managed by the terminal capability management unit a2 to the mobile terminal C.

The video reproduction processing unit a4 interprets and reproduces only the video part of the data delivered by the output unit a13.

Continuously, the peripheral terminal B includes a terminal capability information report unit b1, a terminal capability management unit b2, and an audio reproduction processing unit b3.

The audio reproduction processing unit b3 interprets and reproduces the audio part that exists in the payload part of the received packet.

The terminal capability management unit b1 manages capability information such as a processing performance, a video reproduction capability, and a moving picture reproduction capability of its own terminal.

The terminal capability information report unit b1 reports the capability information that is managed by the terminal capability management unit b2 to the mobile terminal C.

Next, an operation of the packet distribution system configured as mentioned above will be explained in line with the sequence diagram of FIG. 2 while FIG. 3 and FIG. 4 are appropriately employed.

Further, herein, while the case that the mobile terminal C has selected the peripheral terminal A as a terminal for data copying and relay processing/video reproduction, and the peripheral terminal B as a terminal for audio reproduction, respectively, from among a plurality of the peripheral terminals A, B, G, and H is exemplified for explanation, the selection does not need to be limited hereto. It is also possible to select the peripheral terminal of which handover destination becomes a gateway by using the capability information that the terminal capability management unit of the management server manages.

Further, hereinafter, the explanation is made on the assumption that the peripheral terminal A is a network-correspondence terminal having a large-screen display function, the peripheral terminal B is a network-correspondence terminal having a high-quality speaker function, and the Internet node F is a streaming server for providing the contents including video and audio. The network device having a sound recording or picture recording function is acceptable as a peripheral terminal so long as it is a network-correspondence terminal that is operatable in alignment with the mobile terminal. Further, the terminal of which the processing speed is relatively high, for example, a home server installed into a house, is desirably caused to function as this peripheral terminal A.

Each of the mobile terminal C, the peripheral terminal A and the peripheral terminal B shown in FIG. 1 has two kinds of addresses, i.e. the home address (HoA) that is unchanged regardless of movement, and the care-of-address (CoA) that is given in the subnet existing within a communication range, and is used for the routing. Herein, it is assumed that as shown in FIG. 3 and FIG. 4, the HoA and the CoA of the mobile terminal C are an address of A, and an address of a, respectively, the HoA and the CoA of the peripheral terminal A are an address of B1, and an address of b1, respectively, and the HoA and the CoA of the peripheral terminal B are an address of B2, and an address of b2, respectively. The correspondence of these two kinds of the addresses is managed by the address-correspondence management unit e1 of the gateway E.

Further, it is assumed that the gateway E has an address "P", and the Internet node F has a global IP address "Z".

Further, in this embodiment, the case that an ADSL access line is used as a wide-band access, and a 3 GPP access circuit as a narrow-band access is exemplified for explanation. Further, the explanation is made on the assumption that the mobile terminal C is a mobile terminal having subscribed for a 3 GPP service.

Additionally, herein, while "the mobile terminal" is exemplified as a terminal in the side where the narrow-band access is utilized for explanation, the terminal does not need to be limited hereto. When the terminal utilizing the narrow-band access is a target, for example, the distribution technology of the present invention may be applied to the telephone terminal utilizing a public telephone circuit via a modem, and the distribution technology of the present invention may be applied to the terminal that is connected to ISDN via DSU.

Herein, under the above-mentioned envision, occurrence of the case that a user desires to make a shift to the service utilizing not only a larger-screen display but also a high-quality speaker in a situation where he/her is utilizing a small screen and a low-quality earpiece of the mobile terminal is exemplified for explanation.

Upon viewing FIG. 2, when the mobile terminal C makes a request for switching the session while receiving the stream data from the Internet node F (flow 101), each of the peripheral terminals A, B, G, and H reports capability information such as the processing performance, the video reproduction capability, and the moving picture reproduction capability of the terminal to the mobile terminal C. And, the mobile terminal C receives this capability information (flow 102).

Next, the peripheral terminal that becomes a handover destination, and the relay peripheral terminal for performing the relaying process are selected based upon the received capability information of each peripheral terminal by the terminal capability management unit c2 of the mobile terminal C (flow 104). That is, the peripheral terminal A is selected as a relay peripheral terminal/video reproduction terminal capable of copying the data and performing the relaying process, and the peripheral terminal B as an audio reproduction terminal. Information of these selected peripheral terminals A and B is transmitted to the network interface unit d3 of the management server D by the relay report unit c1 of the mobile terminal C together with the address information of the peripheral terminals A and B, and is registered into the terminal capability management unit d1 of the management server D (flow 103).

Next, the mobile terminal C performs a preparation procedure for the handover with the peripheral terminal A and the peripheral terminal B (flow 105 to flow 108).

When the preparation procedure between the mobile terminal C and each of the peripheral terminals A and B has been completed, and the mobile terminal C receives a report saying completion of the preparation, the mobile terminal C issues a policy switchover report to the management server D. That is, it makes a policy switchover request for changing the destination of the stream data from the mobile terminal C to the peripheral terminal A and the peripheral terminal B (flow 109).

The policy setting unit d2 of the management server D, upon receipt of this switchover report, performs a policy registering process, being a process of registering the identification information registered into the terminal capability management unit d1 into the gateway E (flow 110). The changed policy is applied to the stream communication subsequent hereto. In such a manner, the destination of the stream data is changed from the mobile terminal C to the peripheral terminal A and the peripheral terminal B.

Next, the mobile terminal C performs a medium changing process for the Internet node F (flow 111). Herein, the so-called medium changing process is a series of works including various negotiating processes that are performed between the mobile terminal C and the Internet node F, and a process of switching the medium that the Internet node F has. Such a process is necessitated because a difference of the displayable medium exists between the mobile terminal and the peripheral terminal, and the mobile terminal C needs to negotiate a rate or a size of the medium, a codec, etc. with the Internet node F by using a session protocol such as SIP. This processing operation is an already-known operation, and yet is not a main part that constitutes the characteristic of the present invention, so the detailed explanation is omitted.

An uplink message of this medium changing process (flow 111) is a format shown in 201 and 202 of FIG. 3 and 301 and 302 of FIG. 4. That is, when the address-correspondence management function unit e1 of the gateway E receives the packet (FIG. 3: 201) from the mobile terminal C, the special encapsulating function unit e21 decapsulates it (FIG. 3: 202). At this time, the routing function unit e3 transmits the decapsulated packet to the Internet node F because the transmission source address is A, being the HoA of the mobile terminal C that is a target of management (FIG. 3: 202).

When the policy setting unit d2 of the management server D performs the policy setting process for the gateway E, it registers this processing result into the policy management unit e5 of the gateway E, and the policy registration is completed. From now on, the stream packet from the Internet node F is switched to the packet directed to the peripheral terminals A and B.

At first, the gateway E subjects the stream packet (FIG. 2: flow 112) of which the distribution destination has been changed to the peripheral terminals A and B to a header process (FIG. 2: flow 113). This specific operation will be explained by employing FIG. 3.

At first, the NAT function unit e22 of the header processing unit e2 works the stream packet (203) to a format shown in 205. That is, upon receipt of the packet, the network interface unit e4 of the gateway E makes a reference to a port number of a transport layer, and when the port number is a number indicating the stream data, firstly delivers it to the NAT function unit e22. The NAT function unit e22 changes the destination address of the external header of the received packet to "B2", being the HoA of the peripheral terminal B that is a relay destination peripheral terminal based upon the mapping information of the address-correspondence management unit e1 and the identification information reported from the mobile terminal C. This packet is furthermore delivered to the special encapsulating function unit e21, is encapsulated, and is furthermore given the external header of which the destination address is "b1", being the CoA of the peripheral terminal A (205). And, the routing function unit e3 transmits this packet (205) that has been encapsulated and has been given the external header to the peripheral terminal A via the network interface unit e4.

Continuously, when the peripheral terminal A receives this packet (205), the copy function unit a1 acquires the payload part excluding the header of the packet, and the encapsulated data is relayed to the peripheral terminal B, being a relay destination. A specific operation thereof is described below.

At first, when the relay processing unit a14 of the peripheral terminal A receives the packet (205) that has been encapsulated, and has been given the external header, it works the above packet (205) to a format shown in 206. That is, when the relay processing unit a14 in the peripheral terminal A receives the packet (205), it firstly decapsulates the encapsulated part. When the destination of the internal header of the decapsulated packet, which is referenced by the determination unit a11, coincides with "B2", being the HoA of the peripheral terminal B of the identification information pre-reported from the mobile terminal C, the data of the payload part is delivered to the data acquisition unit a12.

Additionally, at this moment, granted that the destination of the decapsulated packet coincides with "b1", being the CoA of the peripheral terminal A itself, the determination unit a11 determines that the above packet is not a packet having arrived by the encapsulation of this technique, but a packet having arrived by the network access by the normal IP header, and does not deliver the data of the payload part to the data acquisition unit a12.

Next, the data acquisition unit a12 acquires the data of the payload part, and the output unit a13 delivers this acquired data to the video reproduction processing unit a4. And, the video reproduction processing unit a4 interprets and reproduces the video part in the data, Continuously, upon receipt of the packet (205) that has been encapsulated and has been given the external header, the relay processing unit a14 changes the destination of the external header to the address "b2", being the CoA of the peripheral terminal B, based upon the identification information pre-reported by the relay report unit c1 of the mobile terminal C (206). And, this packet (206) is transmitted to the peripheral terminal B.

The peripheral terminal B, upon receipt of the packet (206), delivers a data of the payload part to the audio reproduction function unit b3, and the audio reproduction function unit b3 interprets and reproduces only the audio part in the above data.

In the above-mentioned first embodiment, installing the header processing unit into the gateway allowed the packet distributed from the distribution-side node to be delivered to the relay terminal after the header thereof was processed. In addition hereto, installing the copy function unit into the peripheral terminal side enabled the packet to be copied in the peripheral terminal side. For this, there is no necessity for analyzing and allocating the data in the distribution side at the moment of distributing the packet, and it is enough only to deliver the packet to the gateway. Further, there is no necessity for simultaneously distribute the packet to a plurality of the peripheral terminals. That is, it becomes possible to distribute a delivery data to a plurality of the peripheral terminals without imposing a load upon the distribution-side network system.

In addition hereto, the determination unit installed into the copy function unit in the peripheral terminal side is caused to determine whether or not the received packet is a packet that has to be copied, so occurrence of the unnecessary copying process is prevented, thereby making it possible to alleviate the processing load of the peripheral terminal side.

Additionally, while each of the management server and the gateway was caused to function as a separate node in the above-mentioned first embodiment, it is also possible to consolidate the management server and the gateway into one node.

Further, in the above-mentioned embodiment, the case that the mobile terminal received a report of the capability information from the peripheral terminal, and selected the peripheral terminal that became a handover destination was exemplified for explanation. However, it is also possible for the mobile terminal to actively acquire parameter information such as UPnP (Universal Plug and Play) from the peripheral terminal instead of reception of the capability information from the peripheral terminal, and to select and manage the peripheral terminal, which becomes a handover destination, based upon this parameter information.

Further, the above-mentioned embodiment assumed the configuration of installing the terminal capability management function into the management server as well in addition to the mobile terminal; however the configuration of installing this terminal capability management function into only the mobile terminal is also acceptable, and the configuration of consolidating and installing the terminal capability management function of the mobile terminal into the management server side may be employed.

Besides, while the relay peripheral terminal (peripheral terminal A) transmits the packet including the video data and the audio data to the relay destination peripheral terminal (peripheral terminal B) in the above-mentioned embodiment, the relay peripheral terminal may be adapted to transmit the packet including only the data of the audio part.

Next, the second embodiment will be explained by employing FIG. 2, FIG. 4, and FIG. 5.

Each of FIG. 2, FIG. 4, and FIG. 5 is for explaining the second embodiment of the packet distribution system of the present invention, FIG. 5 is a block diagram of the entirety, FIG. 2 is a sequence diagram illustrating a processing flow of the packet, and FIG. 4 is a view illustrating a configuration example of the packet.

Additionally, each unit constituting the second embodiment is identical to that of the first embodiment except for a copy function unit a5/a header processing unit e6, so the identical configuration part will be explained by employing numeral codes identical to the numeral codes used in the explanation of the first embodiment.

Upon making a reference to FIG. 5, a configuration in the second embodiment of the present invention includes the header processing unit e6 and the copy function unit a5 in addition to the components of the first embodiment.

The header processing unit e6 performs a header process for the packet received from the Internet node F, thereby enabling source routing to an IPv6-correspondence peripheral terminal.

Specifically, the header processing unit e6 includes a header giving unit e61 and an NAT function unit e62.

The NAT function unit e62 modifies the address information of the downlink packet received from the Internet node F based upon the mapping information of the address-correspondence management unit e1 and the identification information reported from the mobile terminal C. Specifically, it modifies information of a transmission destination address that exists in the header part of the received downlink packet so that the transmission destination address is changed from the address of which the destination is the mobile terminal C to the address of which the destination is the peripheral terminal B, being a peripheral terminal of the relay destination.

The header giving unit e61 gives an IPv6 routing header of which the destination is a relay destination peripheral terminal to the packet received from the Internet node F.

The copy function unit a5 includes a determination unit a51, a data acquisition unit a52, an output unit a53, and a relay processing unit a54.

The determination unit a51 determines whether or not to perform a copying process based upon a format of the header information. Specifically, it determines that the packet has arrived by the network access by the normal IP header when the header information is not information having a format of the source routing in accordance with an IETF standard.

The data acquisition unit a52 acquires the data of the payload part of the packet based upon a result of determination by the determining unit a51. That is, it acquires the payload part of the received packet when it has been determined by the determining unit a51 that the header information is information having a format of the source routing in accordance with the IETF standard.

The output unit a53 outputs the data of the payload part acquired by he data acquisition unit a52 to the reproduction function.

The relay processing unit a54 transfers the received packet to the peripheral terminal B. Specifically, when the relay processing unit a54 makes a reference to the routing header of the received packet, and detects that the least significant transmission destination in a routing header is the HoA of the relay destination, it sets the most significant address in the above routing header to the transmission destination of the IP header, and transmits the packet including the payload part to the peripheral terminal B.

Next, an operation of the second embodiment will be explained while FIG. 3 and FIG. 5 are appropriately employed in addition to the sequence diagram of FIG. 2.

When the policy setting unit d2 of the management server D registers the policy into the gateway E (flow 110), and changes the destination of the stream data from the mobile terminal C to the peripheral terminal A (flow 111), the gateway E works the received stream packet (303) to a format shown in 305 (flow 113). A specific operation thereof is described below.

When the address-correspondence management unit e1 in the gateway E receives a packet via the network interface unit e4, it makes a reference to a port number of a transport layer of the above packet, and delivers this packet to the NAT function unit e62 when it is a port number indicating the stream data.

The NAT function unit e62 changes the destination address of the received packet (303) to "b1", being the CoA of the peripheral terminal B, based upon the mapping table information of the policy management unit e5 and the identification information reported from the mobile terminal C (herein, the address of the peripheral terminal B has been set to the relay destination).

This packet is furthermore delivered to the header giving unit e61, and is given the format of the source routing in accordance with the IETF standard using the IPv6 routing header. That is, as shown in 305 of FIG. 4, the destination of the IP header is designated to be "b1", being the CoA of the peripheral terminal A, the most significant destination in the routing header to be "b2", being the CoA of the peripheral terminal B, and the second most significant destination in the routing header to be "B2", being the HoA of the peripheral terminal B, and then the packet is transmitted to the peripheral terminal A.

Continuously, when the relay processing unit a54 of the peripheral terminal A receives this packet (305) of which the format has been changed to the that of the source routing in accordance with the IETF standard, it works the above packet (305) to a format shown in 306.

That is, the relay processing unit a54 works the received packet (305) to a packet of having "b2", being the CoA of the peripheral terminal B previously reported by the relay report unit c1 of the mobile terminal C, as a destination of the IP header, and further having "B2", being the HoA of the peripheral terminal B, as the most significant destination in the routing header.

At this time, the determination unit a51 determines whether or not the copying is appropriate based upon a difference of the header information. Specifically, when the header information differs from the information of the IP header by the normal network access, namely, it is information having the format of the source routing in accordance with the IETF standard, the received packet (305) is delivered to the data acquisition unit a52. And, the data of the payload part is acquired, copied, and delivered to the video reproduction processing unit a4. The video reproduction processing unit a4 interprets and reproduces only the video part in the data.

Additionally, at this moment, granted that the header information of the received packet is not information having the format of the source routing in accordance with the IETF standard, the determination unit a51 determines that it has arrived by the network access by the normal IP header, and does not deliver the data of the payload part to the data acquisition unit a52.

Next, the packet (306) of which the header has been worked by the relay processing unit a54 is transmitted to the peripheral terminal B, being a relay destination of the peripheral terminal A.

The peripheral terminal B, upon receipt of the packet (306), delivers a data of the payload part to the audio reproduction function unit b3, and the audio reproduction function unit b3 interprets and reproduces only the audio part in the above data.

The above-mentioned second embodiment assumed the configuration in which the header processing unit changed the format of the header of the received packet to that of the source routing in accordance with the IETE standard using the IPv6 routing header. This makes it possible to distribute the delivery data to a plurality of the peripheral terminals without imposing a load upon the distribution-side network system even though the peripheral terminal is an IPv6-correspondence Network device at the moment of switching the session realized between the mobile terminal and the network side to the session using a plurality of the peripheral terminals together having respective functions.

This application is based upon and claims the benefit of priority from Japanese patent application No. 2006-251743, filed on Sep. 15, 2006, the disclosure of which is incorporated herein in its entirety by reference.

The invention claimed is:

1. A packet distribution system, characterized in that:
  said packet distribution system comprises:
  a terminal comprising:
    selecting means for selecting a relay peripheral terminal for relaying a packet, and a relay destination peripheral terminal that becomes a relay destination of said relay peripheral terminal from among a plurality of peripheral terminals; and
    reporting means for reporting identification information including information associated with at least addresses of said relay destination peripheral terminal and said relay peripheral terminal selected by said selecting means; and
  a communication device comprising header processing means for changing a destination of a header of the packet transmitted from a distribution node in response to a request from said terminal to the address of said relay destination peripheral terminal based upon said identification information, encapsulating this packet, and giving an external header including the address of said relay peripheral terminal; and
  said relay peripheral terminal comprises:
    data acquiring means for decapsulating the packet encapsulated by said communication device, thereby to acquire a data of a payload part;
    outputting means for outputting the data acquired by said acquiring means to a predetermined reproduction function; and
    relay processing means for re-encapsulating said decapsulated packet and relaying it to said relay destination peripheral terminal from header information being contained in said decapsulated packet and the identification information of said relay destination peripheral terminal reported from said terminal.

2. A packet distribution system according to claim 1, characterized in that said relay processing means is configured to change the destination of the external header given by said header processing means to an address for mobile communication of said relay destination peripheral terminal, thereby to relay the received packet to said relay destination peripheral terminal when an independent network is constructed among said terminal, said relay peripheral terminal, and said relay destination peripheral terminal.

3. A packet distribution system according to claim 1, characterized in that said data acquiring means, which comprises determining means for making a reference to a destination of an internal header of the packet received from said communication device to determine whether or not this destination and the address of said relay destination peripheral terminal coincide with each other, is configured to acquire the data of said payload part when it has been determined by said determining means that this destination and the address coincide.

4. A packet distribution system according to claim 1, characterized in that, when each of said plurality of said peripheral terminals is an Ipv6-correspondence terminal:
  said header processing means comprises header processing means for changing the destination of the header of the packet transmitted from the distribution node in response to a request from said terminal to the address of said relay peripheral terminal, and giving an Ipv6 routing header of which the destination is the address of said relay destination peripheral terminal; and
  said relay processing means is configured to change the destination of the header of the packet received from said communication device to an address of the Ipv6 routing header, thereby to relay said received packet to said relay destination peripheral terminal.

5. A packet distribution system according to claim 1, characterized in that said predetermined reproduction function is a video reproduction function or an audio reproduction function.

6. A relay peripheral terminal for relaying a packet transmitted from a distribution node via a communication device in response to a request from a terminal to a relay destination peripheral terminal that becomes a relay destination, characterized in comprising:
  data acquiring means for decapsulating the packet encapsulated by said communication device, thereby to acquire a data of a payload part;
  outputting means for outputting the data acquired by said data acquiring means to a predetermined reproduction function; and
  relay processing means for, based upon header information being contained in said decapsulated packet and identification information of said relay destination peripheral terminal reported from said terminal, re-encapsulating said decapsulated packet and relaying said decapsulated packet as has been re-encapsulated to said relay destination peripheral terminal.

7. A relay peripheral terminal according to claim 6, characterized in that said relay processing means is configured to change a destination of an external header given to said encapsulated packet by said communication device to an address for mobile communication of said relay destination peripheral terminal, thereby to relay the received packet to said relay destination peripheral terminal when an independent local network is constructed among said terminal, said relay peripheral terminal, and said relay destination peripheral terminal.

8. A relay peripheral terminal according to claim 6, characterized in that said data acquiring means, which comprises determining means for making a reference to a destination of an internal header of the packet received from said communication device, and determining whether or not this destination and the address of said relay destination peripheral terminal coincide with each other, is configured to acquire the data of said payload part when it has been determined by said determining means that this destination and the address coincide.

9. A relay peripheral terminal according to claim 6, characterized in that, when each of said relay peripheral terminal and said relay destination peripheral terminal is an Ipv6-correspondence terminal, said relay processing means is configured to change the destination of the header of the packet received from said communication device to an address of an Ipv6 routing header, thereby to relay said received packet to said relay destination peripheral terminal.

10. A relay peripheral terminal according to claim 6, characterized in that said predetermined reproduction function is a video reproduction function or an audio reproduction function.

11. A packet distribution method, characterized in comprising:
a selecting step of causing a terminal to select a relay peripheral terminal for relaying a packet, and a relay destination peripheral terminal that becomes a relay destination of said relay peripheral terminal from among a plurality of peripheral terminals;
a header processing step of changing a destination of a header of the packet transmitted from a distribution node in response to a request from said terminal to an address of said relay destination peripheral terminal based upon identification information including information reported by said terminal, said information being associated with at least addresses of said relay destination peripheral terminal and said relay peripheral terminal, encapsulating this packet, and giving an external header including the address of said relay peripheral terminal;
a data acquiring step of decapsulating the packet encapsulated in said header processing step, thereby to acquire a data of a payload part;
an outputting step of outputting the data acquired in said data acquiring step to a predetermined reproduction function; and
a relay processing step of re-encapsulating said decapsulated packet and relaying it to said relay destination peripheral terminal from header information being contained in said decapsulated packet and the identification information of said relay destination peripheral terminal reported from said terminal.

12. A packet distribution method according to claim 11, characterized in that said relay processing step is a step of changing the destination of the external header given in said header processing step to an address for mobile communication of said relay destination peripheral terminal, thereby to relay the received packet to said relay destination peripheral terminal when an independent local network is constructed among said terminal, said relay peripheral terminal, and said relay destination peripheral terminal.

13. A packet distribution method according to claim 11, characterized in that
said data acquiring step, which comprises a determining step of making a reference to a destination of an internal header of the packet received from a communication device, and determining whether or not this destination and the address of said relay destination peripheral terminal coincide with each other, is a step of acquiring the data of said payload part when it has been determined in said determining step that this destination and the address coincide.

14. A packet distribution method according to claim 11, characterized in, when each of said plurality of said peripheral terminals is an Ipv6-correspondence terminal, comprising:
a header processing step of changing the destination of the header of the packet transmitted from the distribution node in response to a request from said terminal to the address of said relay peripheral terminal, and giving an Ipv6 routing header of which the destination is the address of said relay destination peripheral terminal; and
a relay processing step of changing the destination of the header of the packet received from said communication device to an address of the Ipv6 routing header, thereby to relay said received packet to said relay destination peripheral terminal.

* * * * *